United States Patent
Yoshikawa et al.

(10) Patent No.: US 12,496,970 B2
(45) Date of Patent: Dec. 16, 2025

(54) DEVICE, METHOD, AND PROGRAM FOR GENERATING AN OVERHEAD IMAGE AROUND A VEHICLE RELATIVE TO A TARGET OBJECT

(71) Applicants: HONDA MOTOR CO., LTD., Tokyo (JP); AISIN CORPORATION, Aichi (JP)

(72) Inventors: Fumiaki Yoshikawa, Tokyo (JP); Takeshi Iijima, Tokyo (JP); Osamu Takahata, Tokyo (JP); Kazuya Watanabe, Kariya (JP)

(73) Assignees: HONDA MOTOR CO., LTD., Tokyo (JP); AISIN CORPORATION, Kariya (JP)

( * ) Notice: Subject to any disclaimer, the term of this patent is extended or adjusted under 35 U.S.C. 154(b) by 33 days.

(21) Appl. No.: 18/545,512

(22) Filed: Dec. 19, 2023

(65) Prior Publication Data
US 2025/0196771 A1    Jun. 19, 2025

(51) Int. Cl.
*B60R 1/22*    (2022.01)

(52) U.S. Cl.
CPC .......... *B60R 1/22* (2022.01); *B60R 2300/105* (2013.01); *B60R 2300/305* (2013.01); *B60R 2300/607* (2013.01); *B60R 2300/802* (2013.01)

(58) Field of Classification Search
CPC .... B60R 1/28; B60R 1/25; B60R 1/26; B60R 1/003; B60R 2300/303
USPC .......................................................... 348/148
See application file for complete search history.

(56) References Cited

U.S. PATENT DOCUMENTS

| | | | |
|---|---|---|---|
| 10,703,273 B2 | 7/2020 | Gomex-Mendoza | |
| 2014/0085472 A1* | 3/2014 | Lu | B60R 1/26 348/148 |
| 2016/0167583 A1* | 6/2016 | Schrepfer | B60R 11/04 348/148 |
| 2021/0146835 A1* | 5/2021 | Critchley | H04N 7/18 |
| 2021/0370912 A1* | 12/2021 | Yamamoto | H04N 7/18 |
| 2022/0297601 A1* | 9/2022 | Hatzakis | B60R 1/25 |
| 2023/0406410 A1* | 12/2023 | Sperrle | H04N 5/91 |

FOREIGN PATENT DOCUMENTS

JP    6425991 B2    11/2018

\* cited by examiner

*Primary Examiner* — Nathnael Aynalem
(74) *Attorney, Agent, or Firm* — Rankin, Hill & Clark LLP

(57) ABSTRACT

A control device includes an image processing unit that generates an overhead image of a vehicle and its surroundings using a plurality of pieces of imaging data acquired by cameras in the vehicle, a display control unit that displays the overhead image, a touch panel, and a blind spot area determination unit that determines a blind spot area in the imaging data based on detection of a trailer around the vehicle. The image processing unit changes allocation of first imaging data and second imaging data in the overhead image based on whether it is determined that the blind spot area exists in the first imaging data.

11 Claims, 9 Drawing Sheets

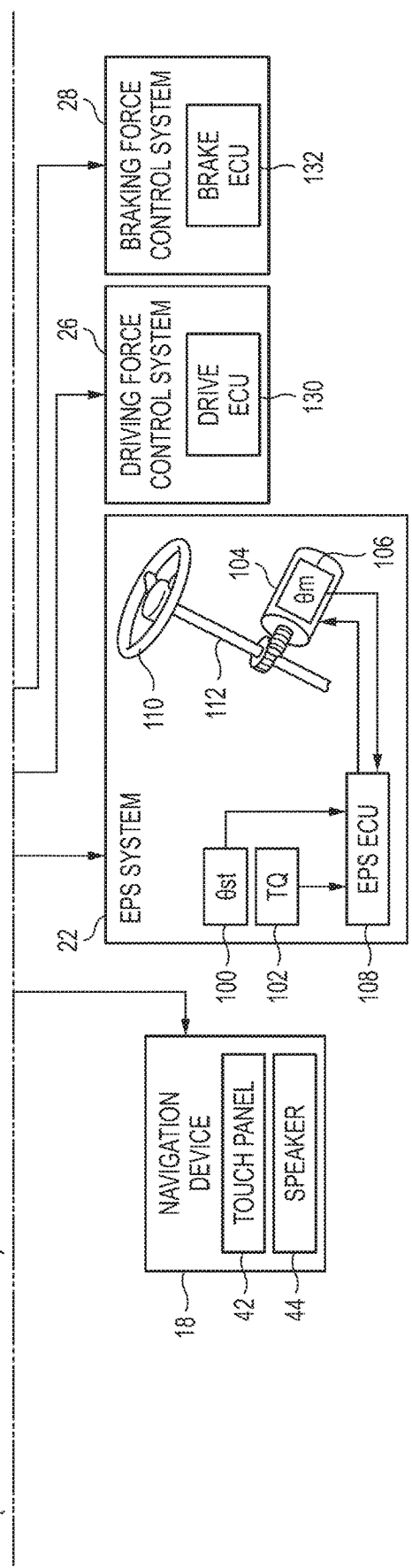

DEVICE, METHOD, AND PROGRAM FOR GENERATING AN OVERHEAD IMAGE AROUND A VEHICLE RELATIVE TO A TARGET OBJECT

TECHNICAL FIELD

The present invention relates to a control device, a control method, and a storage medium storing a control program.

BACKGROUND ART

In recent years, efforts have become active to provide access to a sustainable transport system that considers the most vulnerable of transport participants. To achieve such goal, inventors are focusing on research and development that will further improve traffic safety and convenience through research and development on driving support technology.

In recent years, there has been known a technique for displaying a state of the outside world of a vehicle as a multi-view image including an overhead image and a three-dimensional image on a display device. For example, U.S. Pat. No. 10,703,273B discloses a processing device that generates an overhead image of the outside world of a vehicle based on width and length of the vehicle, width and length of a trailer towed by the vehicle, and a distance between the vehicle and the trailer, and adjusts the overhead image based on a steering wheel angle of the vehicle. JP6425991B discloses a towing vehicle surrounding image generation device that generates a vehicle surrounding image by converting images cut out from a rear image, a left side image, and a right side image acquired by an image acquisition unit into a bird's-eye view image with a viewpoint above a towing vehicle and combining the converted images, and combines a blind spot area image showing a blind spot in an area that becomes a blind spot due to a connecting part or a towed vehicle.

By the way, there are cases where a vehicle tows, for example, a trailer. Here, an area that can be imaged by a rear camera of the vehicle is blocked by the trailer or the like, creating a blind spot, resulting in distortion in an overhead image of the outside world of the vehicle, which is generated as a multi-view image by the rear camera, or the like. To prevent occurrence of the distortion in the overhead image, it is necessary to take measures regarding the blind spot area of camera imaging. However, U.S. Pat. No. 10,703,273B and JP6425991B do not describe preventing occurrence of the blind spot area of camera imaging. Therefore, there is room for improvement in the distortion of the overhead image that occurs due to the blind spot area of camera imaging.

An object of the present invention is to provide a control device, a control method, and a storage medium storing a control program that can generate an overhead image that can improve visibility around a vehicle. This, in turn, contributes to development of a sustainable transportation system.

SUMMARY OF INVENTION

According to an aspect of the present invention, there is provided a control device including:

an image processing unit that generates an overhead image showing a space including a moving object and surroundings of the moving object using a plurality of pieces of imaging data acquired by a plurality of imaging devices in the moving object;

a display control unit that displays the overhead image generated by the image processing unit on a display device;

and a blind spot area determination unit determines a blind spot area in the imaging data based on detection of a target object around the moving object, in which the image processing unit changes allocation of first imaging data and second imaging data different from the first imaging data in the overhead image based on whether it is determined that the blind spot area exists in the predetermined first imaging data among the plurality of pieces of imaging data.

According to another aspect of the present invention, there is provided a control method by a control device including steps executed by a processor of the control device of:

generating an overhead image showing a space including a moving object and surroundings of the moving object using a plurality of pieces of imaging data acquired by a plurality of imaging devices in the moving object, causing a display device to display the generated overhead image, determining a blind spot area in the imaging data based on detection of a target object around the moving object, and when generating the overhead image, changing allocation of first imaging data and second imaging data different from the first imaging data in the overhead image based on whether it is determined that the blind spot area exists in the predetermined first imaging data among the plurality of pieces of imaging data.

According to another aspect of the present invention, there is provided a storage medium storing a control program for a control device that causes a processor of the control device to execute processes of, generating an overhead image showing a space including a moving object and surroundings of the moving object using a plurality of pieces of imaging data acquired by a plurality of imaging devices in the moving object, causing a display device to display the generated overhead image, determining a blind spot area in the imaging data based on detection of a target object around the moving object, and when generating the overhead image, changing allocation of first imaging data and second imaging data different from the first imaging data in the overhead image based on whether it is determined that the blind spot area exists in the predetermined first imaging data among the plurality of pieces of imaging data.

DESCRIPTION OF EMBODIMENTS

Figure 1:
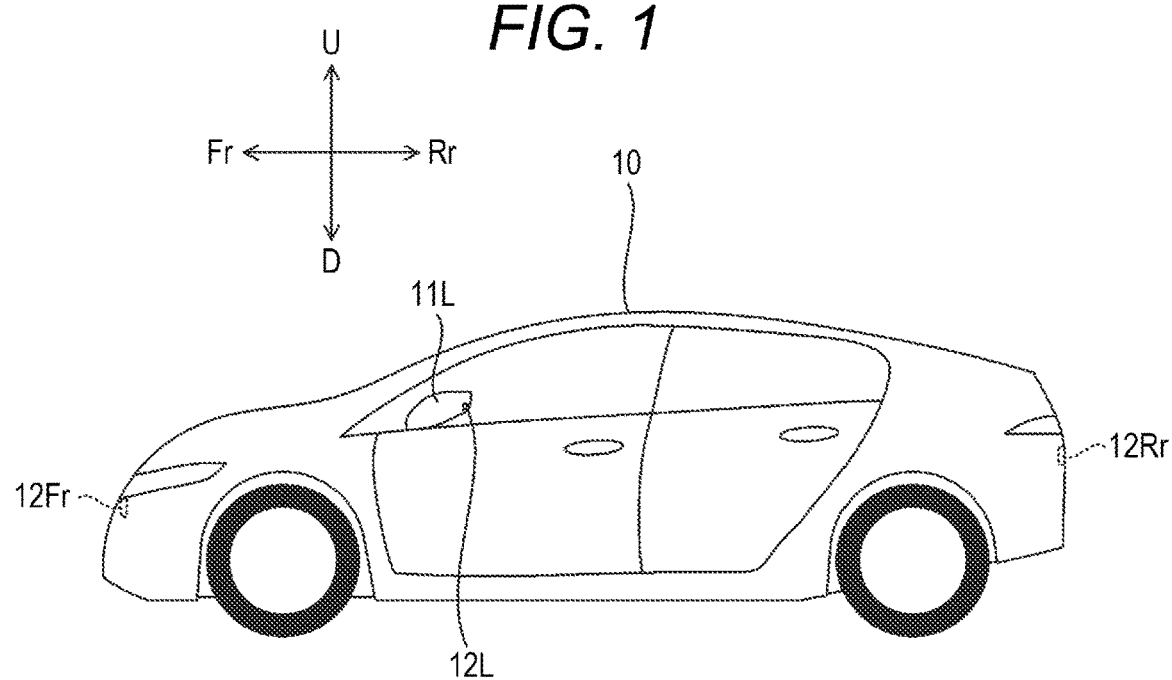
FIG. 1 is a side view illustrating an example of a vehicle equipped with a control device of the present invention.

An embodiment of a control device, a control method, and a storage medium storing a control program of the present invention will be described below with reference to the accompanying drawings. The drawings should be viewed in a direction of symbols. In the present specification and the like, to simplify and clarify the description, front and rear, left and right, and up and down directions are described according to directions seen from a driver of a vehicle 10 illustrated in FIGS. 1 and 2. In the drawings, the front of the vehicle 10 is shown as Fr, the rear as Rr, the left side as L, the right side as R, the upper side as U, and the lower side as D.

Vehicle 10 Equipped with Control Device of Present Invention

Figure 2:
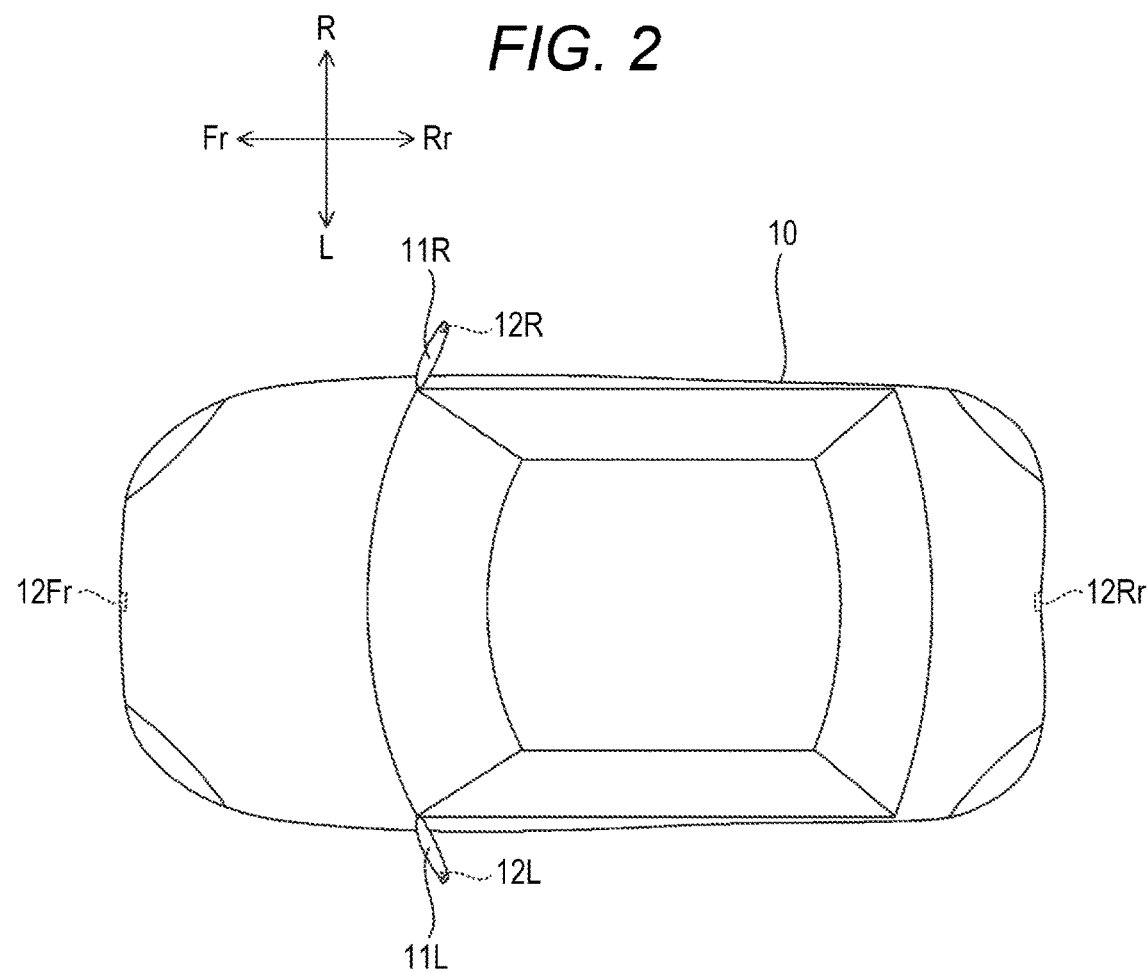
FIG. 2 is a top view of the vehicle illustrated in FIG. 1.

FIG. 1 is a side view illustrating an example of a vehicle equipped with a control device of the present invention. FIG. 2 is a top view of the vehicle illustrated in FIG. 1. The vehicle 10 is an example of a "moving object" of the present invention.

The vehicle 10 is an automobile that includes a drive source (not illustrated) and wheels including drive wheels driven by power of the drive source and steerable wheels. In the present embodiment, the vehicle 10 is a four-wheeled automobile including a pair of left and right front wheels and a pair of left and right rear wheels. The vehicle 10 is, for example, an automobile capable of towing a trailer or the like. The vehicle 10 is an example of a "moving object" of the present invention. A trailer is an example of a "target object" according to the present invention. The drive source of the vehicle 10 is, for example, an electric motor.

The drive source of the vehicle 10 may be an internal combustion engine such as a gasoline engine or a diesel engine, or may be a combination of an electric motor and an internal combustion engine. The drive source of the vehicle 10 may drive the pair of left and right front wheels, the pair of left and right rear wheels, or four wheels of the pairs of left and right front wheels and rear wheels. Both of the front wheels and the rear wheels may be steerable wheels, or one pair of the wheels may be steerable wheels.

The vehicle 10 further includes side mirrors 11L and 11R. The side mirrors 11L and 11R are mirrors (rearview mirrors) provided on the outside of front seat doors of the vehicle 10 for the driver to check the rear and rear sides. The side mirrors 11L and 11R are each fixed to a main body of the vehicle 10 by vertically extending rotation shafts, and can be opened and closed by rotating around the rotation shafts.

The vehicle 10 further includes a front camera 12Fr, a rear camera 12Rr, a left side camera 12L, and a right side camera 12R. The front camera 12Fr is a digital camera that is provided in front of the vehicle 10 and is capable of capturing a wide angle image of a front direction of the vehicle 10. The rear camera 12Rr is a digital camera that is provided at a rear of the vehicle 10 and is capable of capturing a wide angle image of a rear direction of the vehicle 10. The left side camera 12L is a digital camera that is provided on the left side mirror 11L of the vehicle 10 and is capable of capturing a wide angle image of a left side direction of the vehicle 10. The right side camera 12R is a digital camera that is provided on the right side mirror 11R of the vehicle 10 and is capable of capturing a wide angle image of a right side direction of the vehicle 10. The front camera 12Fr, the rear camera 12Rr, the left side camera 12L, and the right side camera 12R are examples of an "imaging device" of the present invention.

Internal Configuration of Vehicle 10

Figure 3:
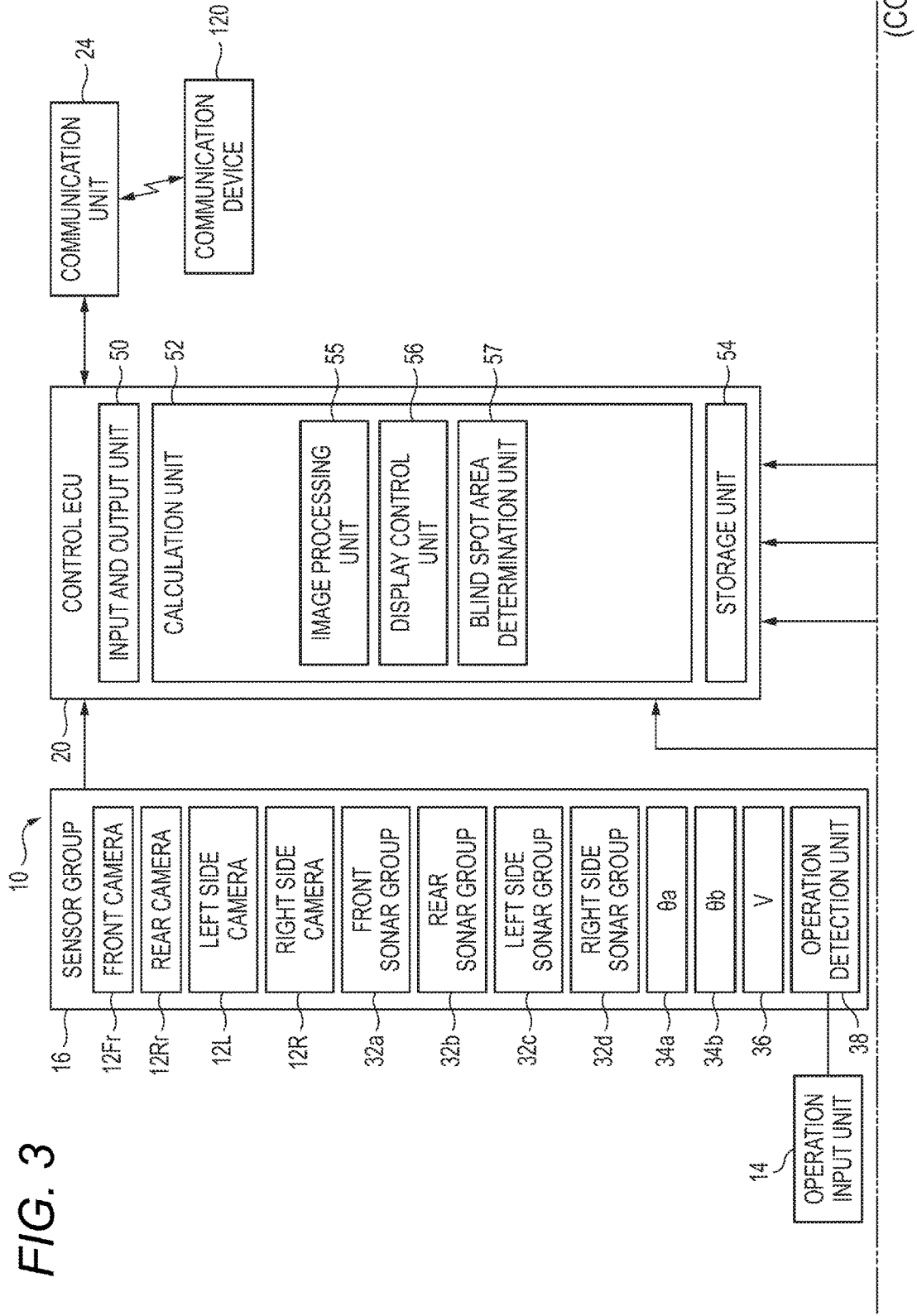
FIG. 3 is a block diagram illustrating an example of an internal configuration of the vehicle illustrated in FIG. 1.

FIG. 3 is a block diagram illustrating an example of an internal configuration of the vehicle illustrated in FIG. 1. As illustrated in FIG. 3, the vehicle 10 includes a sensor group 16, a navigation device 18, a control electronic control unit (ECU) 20, an electric power steering (EPS) system 22, and a communication unit 24. The vehicle 10 also includes a driving force control system 26 and a braking force control system 28.

The sensor group 16 acquires various detected values used for control by the control ECU 20. The sensor group 16 includes the front camera 12Fr, the rear camera 12Rr, the left side camera 12L, and the right side camera 12R. The sensor group 16 includes a front sonar group 32a, a rear sonar group 32b, a left side sonar group 32c, and a right side sonar group 32d. The sensor group 16 includes wheel sensors 34a and 34b, a vehicle speed sensor 36, and an operation detection unit 38.

The front camera 12Fr, the rear camera 12Rr, the left side camera 12L, and the right side camera 12R capture images of the outside world of the vehicle 10, thereby acquiring imaging data for recognizing the vehicle 10 and surroundings thereof. Images around the vehicle 10 captured by the front camera 12Fr, rear camera 12Rr, left side camera 12L, and right side camera 12R are respectively referred to as a front image, a rear image, a left side image, and a right side image. An image composed of a left side image and a right side image may be referred to as a side image. The image of the vehicle 10 and the surroundings of the vehicle, which is generated by combining the imaging data of the front camera 12Fr, the rear camera 12Rr, the left side camera 12L, and the right side camera 12R, is referred to as an overhead image of the vehicle 10.

The front sonar group 32a, the rear sonar group 32b, the left sonar group 32c, and the right sonar group 32d emit sound waves around the vehicle 10 and receive reflected sounds from other objects. The front sonar group 32a includes, for example, four sonars. The sonars forming the front sonar group 32a are respectively provided at the diagonally left front, the front left, the front right, and the diagonally front right of the vehicle 10. The rear sonar group 32b includes, for example, four sonars. The sonar forming the rear sonar group 32b are respectively provided at the diagonally rear left, the rear left, the rear right, and the diagonally rear right of the vehicle 10. The left side sonar group 32c includes, for example, two sonars. The sonars forming the left side sonar group 32c are respectively provided at the front of a left side and the rear of the left side of the vehicle 10. The right side sonar group 32d includes, for example, two sonars. The sonars forming the right side sonar group 32d are respectively provided at the front of a right side and the rear of the right side of the vehicle 10.

The wheel sensors 34a and 34b detect rotation angles of the wheels of the vehicle 10. The wheel sensors 34a and 34b may be configured by angle sensors or displacement sensors. The wheel sensors 34a and 34b output detection pulses every time the wheels rotate by a predetermined angle. The detection pulses output from the wheel sensors 34a and 34b are used to calculate the rotation angle and a rotation speed of the wheels. A distance traveled by the vehicle 10 is calculated based on the rotation angle of the wheels. The wheel sensor 34a detects, for example, a rotation angle θa of a left rear wheel. The wheel sensor 34b detects, for example, a rotation angle θb of a right rear wheel.

The vehicle speed sensor 36 detects the speed of the vehicle body of the vehicle 10, that is, a vehicle speed V, and outputs the detected vehicle speed V to the control ECU 20. The vehicle speed sensor 36 detects the vehicle speed V based on, for example, the rotation of a countershaft of a transmission. The sensor group 16 may also include, for example, a target object detection sensor capable of detecting a target object in the vicinity of the vehicle 10. Target objects include a trailer connected to (towed by) the vehicle 10, other vehicles existing around the vehicle, and the like. The target object detection sensor includes, for example, a radar, a light detection and ranging or laser imaging detection and ranging (lidar), a sonar, a yaw rate sensor, a magnetic sensor, a steering angle sensor, and the like.

The operation detection unit 38 detects the content of an operation performed by a user using an operation input unit 14, and outputs the detected content of the operation to the brake ECU 20. The operation input unit 14 includes various user interfaces such as a side mirror switch for switching an open and closed state of the side mirrors 11L and 11R, and a shift lever (select lever or selector).

The navigation device 18 uses, for example, a global positioning system (GPS) to detect a current position of the vehicle 10 and guides the user on a route to a destination. The navigation device 18 includes a storage device (not illustrated) provided with a map information database.

The navigation device 18 is equipped with a touch panel 42 and a speaker 44. The touch panel 42 functions as an input device and a display device for the control ECU 20. The touch panel 42 is configured so that various commands to the control ECU 20 can be input. For example, the user can input various commands to the vehicle 10 via the touch panel 42. The touch panel 42 is configured to display various screens related to control contents of the control ECU 20. For example, the touch panel 42 displays an overhead image generated by combining the imaging data of the front camera 12Fr, the rear camera 12Rr, the left side camera 12L, and the right side camera 12R. Components other than the touch panel 42, such as a smartphone or a tablet terminal, may be used as an input device or a display device. The speaker 44 outputs various types of guidance information to the user of the vehicle 10 by voice.

The control ECU 20 includes an input and output unit 50, a calculation unit 52, and a storage unit 54. The calculation unit 52 is configured by, for example, a central processing unit (CPU). The calculation unit 52 performs various controls by controlling each unit based on programs stored in the storage unit 54. The calculation unit 52 inputs and outputs signals to and from each unit connected to the control ECU 20 via the input and output unit 50. The control ECU 20 is an example of the "control device" of the present invention.

The calculation unit 52 includes an image processing unit 55, a display control unit 56, and a blind spot area determination unit 57.

The image processing unit 55 generates an overhead image showing a space including the vehicle 10 and the surroundings of the vehicle 10 using a plurality of pieces of imaging data acquired by the front camera 12Fr, the rear camera 12Rr, the left side camera 12L, and the right side camera 12R. The image processing unit 55 generates the overhead image by changing allocation of first imaging data and second imaging data different from the first imaging data in the overhead image based on whether it is determined that a blind spot area exists in predetermined first imaging data among the plurality of pieces of imaging data.

"Blind spot area" is an area that is blocked by a target object such as a trailer and is a blind spot. "First imaging data" is imaging data acquired by the front camera 12Fr or the rear camera 12Rr. "Second imaging data" is imaging data acquired by the left side camera 12L or the right side camera 12R.

When it is determined that a blind spot area exists in the first imaging data, the image processing unit 55 reduces the allocation of the first imaging data in the overhead image and increases the allocation of the second imaging data in the overhead image than when it is determined that there is no blind spot area in the first imaging data. When it is determined that a blind spot area exists in the first imaging data, the image processing unit 55 reduces the allocation of the first imaging data in a portion of the overhead image that corresponds to the blind spot area than when it is determined that there is no blind spot area in the first imaging data, and increases the allocation of the second imaging data in a portion of the overhead image that corresponds to the blind spot area.

When it is determined that a blind spot area exists in the first imaging data, and there is an area in the portion of the overhead image corresponding to the blind spot area that cannot be complemented with the second imaging data, the image processing unit 55 allocates a blind spot area image indicating a blind spot area to the area that cannot be complemented. The "blind spot area image" may be, for example, an image in which the blind spot area is painted black, may be an image in which a message is displayed in the blind spot area, may be an image in which the blind spot area is hatched, or may be an image in which the blind spot area is hatched and displayed with a message.

The display control unit 56 causes the display device to display the overhead image generated by the image processing unit 55. The display device may be, for example, the touch panel 42 of the navigation device 18, or a smartphone, a tablet terminal, or the like of the user. The blind spot area determination unit 57 determines the blind spot area in the imaging data based on the detection of the target object around the vehicle 10. The blind spot area determination unit 57 determines the blind spot area based on characteristics of the target object and a positional relationship between the target object and the vehicle 10. The "characteristics of the target object" include shape, size, color, and the like of the target object. The "positional relationship" includes a distance from the vehicle 10 to the target object, a relative angle of the target object with respect to the vehicle 10, and the like.

The blind spot area determination unit 57 determines the characteristics of the target object and the positional relationship of the target object based on at least one of the plurality of pieces of imaging data acquired by the front camera 12Fr, the rear camera 12Rr, the left side camera 12L, and the right side camera 12R. For example, when information regarding the characteristics and the positional relationship of the target object is input from the user, the blind spot area determining unit 57 may make the determination based on the input information. The blind spot area determination unit 57 may determine the characteristics of the target object and the positional relationship between the target object and the vehicle 10 based on sensing data from a sensor (radar/lidar, sonar, yaw rate sensor, magnetic sensor, steering angle sensor) other than the camera. The blind spot area determination unit 57 may make the determination based on, for example, communication with the trailer being towed. Specifically, the determination may be made based on the strength of radio waves received from the trailer or by having the trailer transmit specific information.

The EPS system 22 includes a steering angle sensor 100, a torque sensor 102, an EPS motor 104, a resolver 106, and an EPS ECU 108. The steering angle sensor 100 detects a steering angle θst of the steering wheel 110. The torque sensor 102 detects torque TQ applied to the steering wheel 110.

The EPS motor 104 provides driving force or reaction force to a steering wheel column 112 connected to the steering wheel 110, thereby enabling operation support for the steering wheel 110 by an occupant and automatic steering during parking assistance. The resolver 106 detects a rotation angle θm of the EPS motor 104. The EPS ECU 108 is in charge of overall control of the EPS system 22. The EPS ECU 108 includes an input and output unit (not illustrated), a calculation unit (not illustrated), and a storage unit (not illustrated).

The communication unit 24 enables wireless communication with other communication devices 120. Other communication devices 120 include base stations, communication devices of other vehicles, and information terminals such as smartphones or tablet terminals that can be carried by the user of the vehicle 10. For example, the communication unit 24 includes a UWB interface for performing ultra-wideband (UWB: registered trademark) communication with an information terminal.

The driving force control system 26 includes a drive ECU 130. The driving force control system 26 controls the driving force of the vehicle 10. The drive ECU 130 controls the driving force of the vehicle 10 by controlling an engine (not illustrated) or the like based on a user's operation of an accelerator pedal (not illustrated).

The braking force control system 28 includes a brake ECU 132. The braking force control system 28 controls the braking force of the vehicle 10. The brake ECU 132 controls the braking force of the vehicle 10 by controlling a brake mechanism (not illustrated) or the like based on a user's operation of a brake pedal (not illustrated).

Generation of Overhead Image by Image Processing Unit 55

Figure 4:
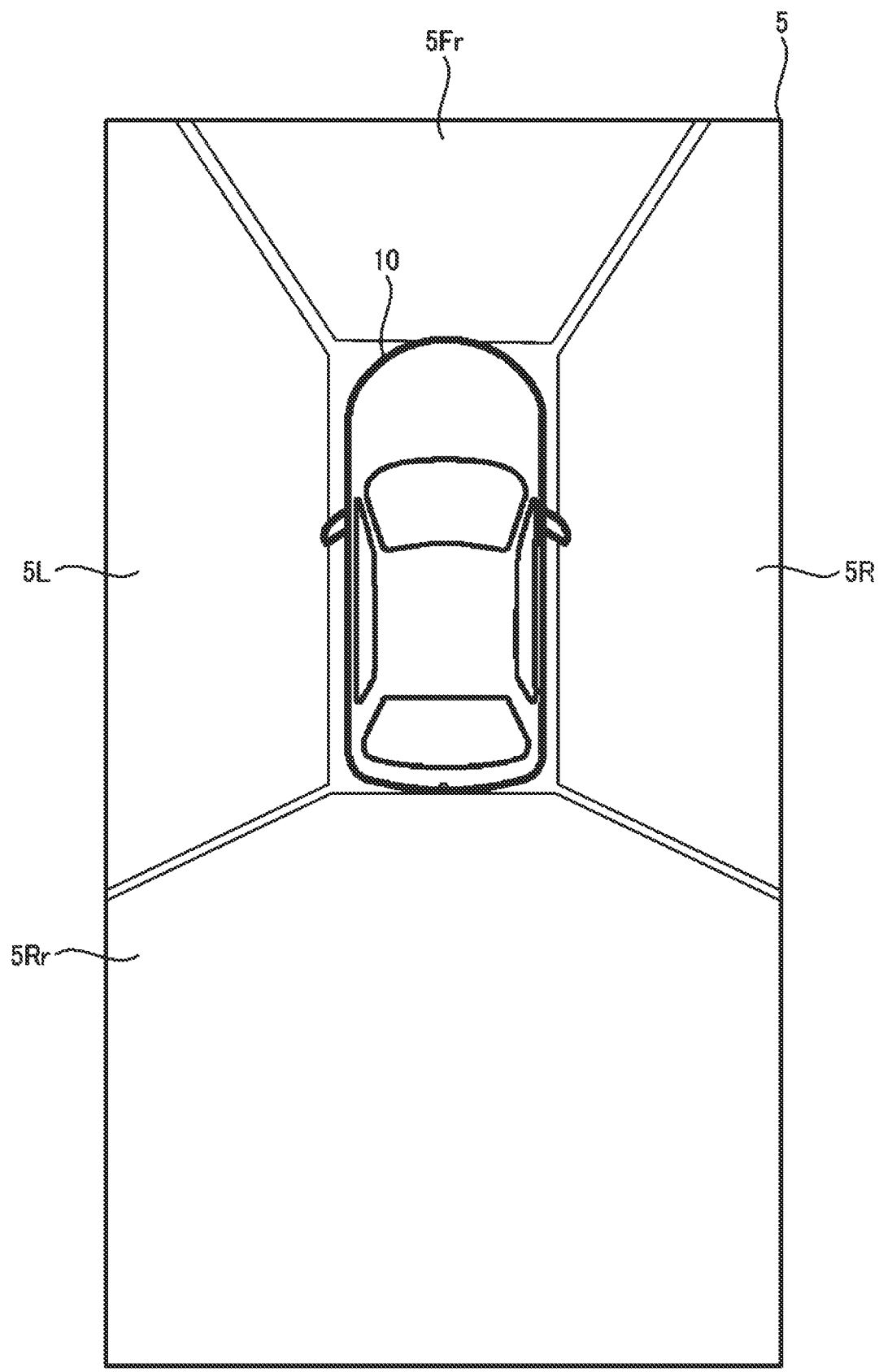
FIG. 4 is a diagram illustrating an example of an overhead image generated based on imaging data acquired by a front camera, a left side camera, a right side camera, and a rear camera.

Next, generation of an overhead image by the image processing unit 55 will be described with reference to FIG. 4. FIG. 4 is a diagram illustrating an example of an overhead image generated based on imaging data acquired by the front camera, the left side camera, the right side camera, and the rear camera. An overhead image 5 in FIG. 4 is an overhead image when no target object is detected around the vehicle 10 and there is no blind spot area in the imaging data. The overhead image 5 is displayed on the touch panel 42 of the navigation device 18, for example.

As illustrated in FIG. 4, when generating the overhead image 5 of the vehicle 10, the image processing unit 55 performs viewpoint conversion on the imaging data of each imaging area captured by the front camera 12Fr, the left side camera 12L, the right side camera 12R, and the rear camera 12Rr so that the image is viewed from a predetermined viewpoint position vertically above the vehicle 10 while correcting image distortion or the like. The image processing unit 55 extracts, from respective converted images obtained by the conversion process, a front image 5Fr, a left side image 5L, a right side image 5R, and a rear image 5Rr within a predetermined view angle range set for each converted image so that images in boundary areas of adjacent converted images are consistent with each other. Then, the image processing unit 55 generates the overhead image 5 by combining the extracted front image 5Fr, the left side image 5L, the right side image 5R, and the rear image 5Rr.

Blind Spot Area of Related Art Caused by Target Object Around Vehicle 10

Figure 5:
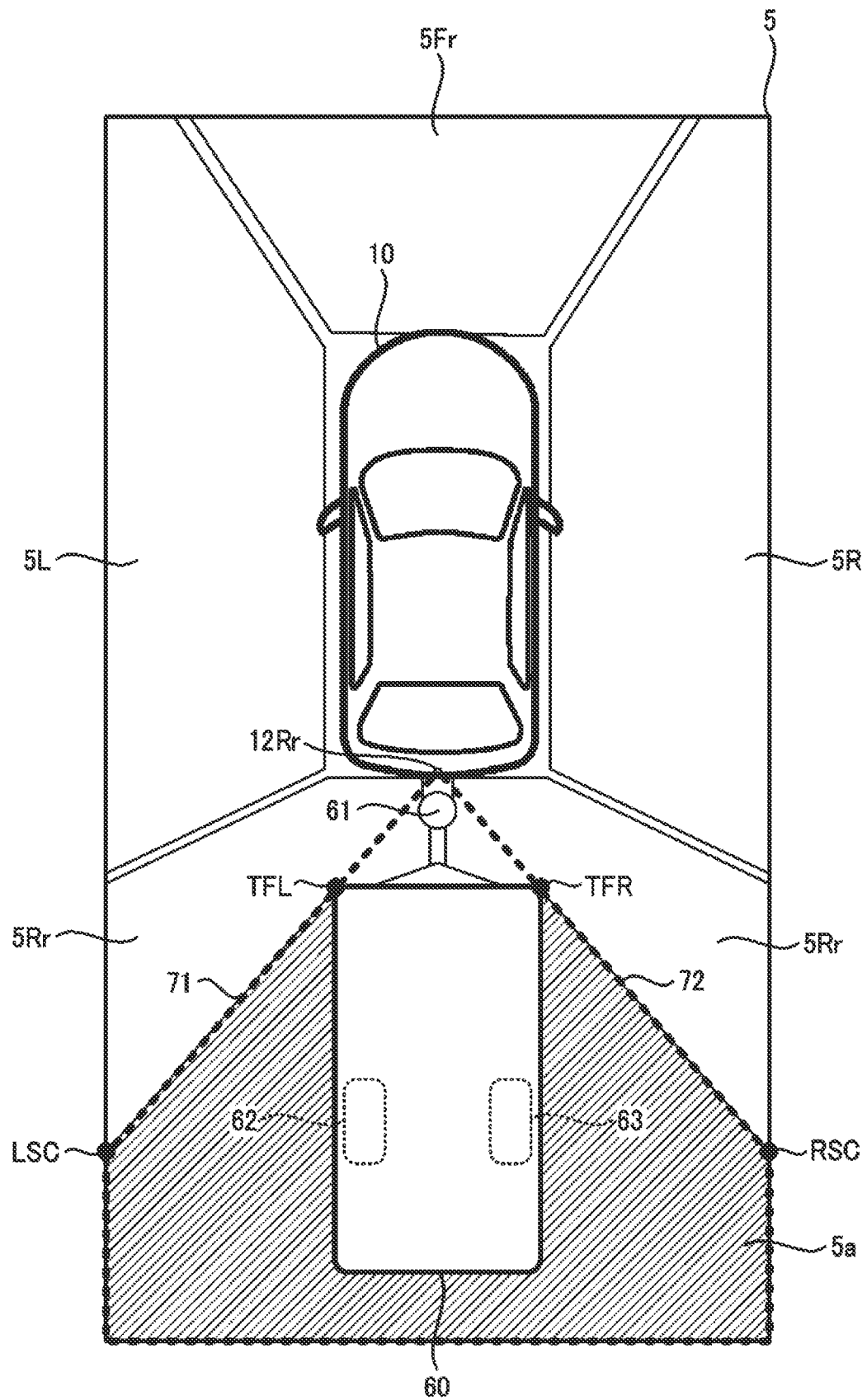
FIG. 5 is a diagram illustrating an example of a blind spot area of the related art caused by towing a trailer.

FIG. 5 is a diagram illustrating an example of a blind spot area of the related art caused by towing a trailer. As illustrated in FIG. 5, in the overhead image 5 displayed on the touch panel 42, a left half line 71 is drawn starting from rear camera coordinates indicating a position of the rear camera 12Rr of the vehicle 10 and passing through trailer left front coordinates indicating a front left end TFL of a trailer 60 including wheels 62 and 63. Similarly, a right half line 72 is drawn starting from the rear camera coordinates indicating the position of the rear camera 12Rr and passing through trailer right front coordinates indicating a front right end TFR of the trailer 60. Coordinates of an intersection position LSC where the left half line 71 intersects with an edge of the overhead image 5 are defined as left intersection coordinates, and coordinates of an intersection position RSC where the right half line 72 intersects with an edge of the overhead image 5 are defined as right intersection coordinates. In the present example, the intersection position LSC intersects with a left edge of the overhead image 5, and the intersection position RSC intersects with a right edge of the overhead image 5. "Coordinates" are coordinates corresponding to the overhead image 5, and are coordinates on a plane based on a position and an orientation of the vehicle 10.

Here, a hatched area in the rear image 5Rr surrounded by the trailer left front coordinates indicating the front left end TFL, the left intersection coordinates indicating the intersection position LSC, the right intersection coordinates indicating the intersection position RSC, and the trailer right front coordinates indicating the front right end TFR becomes a blind spot area 5a blocked by the trailer 60. Due to the occurrence of the blind spot area 5a, distortion occurs in the rear image 5Rr in the overhead image 5. The blind spot area illustrated in FIG. 5 is a blind spot area that occurs when the vehicle 10 is not being steered and the trailer 60 is being towed with a positional relationship between the vehicle 10 and the trailer 60 in a straight line.

Figure 6:
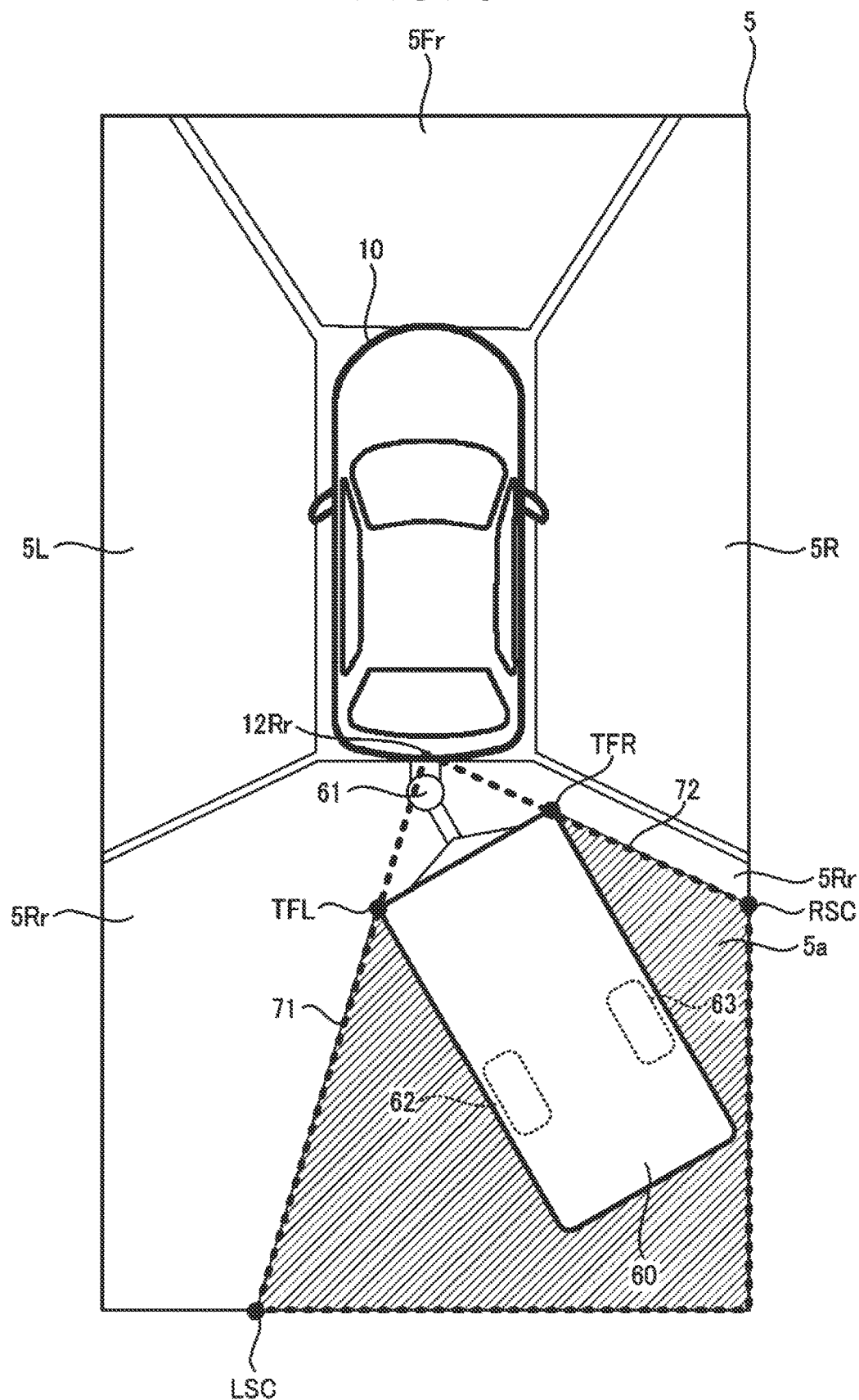
FIG. 6 is a diagram illustrating an example of the blind spot area of the related art that occurs when a vehicle towing a trailer is being steered.

FIG. 6 is a diagram illustrating an example of the blind spot area of the related art that occurs when a vehicle towing a trailer is being steered. As illustrated in FIG. 6, when the vehicle 10 towing the trailer 60 changes a traveling direction thereof, for example to the right, a connection angle of the trailer 60 to the vehicle 10 changes with a hitch ball 61 as a starting point. Therefore, the intersection position LSC of the left half line 71 and the intersection position RSC of the right half line 72 each move to the right according to the change in the connection angle. As a result, in the present example, the intersection position LSC intersects with a rear edge of the overhead image 5. Therefore, the blind spot area 5a surrounded by the trailer left front coordinates indicating the front left end TFL, the left intersection coordinates indicating the intersection position LSC, the right intersection coordinates indicating the intersection position RSC, and the trailer right front coordinates indicating the front right end TFR is a hatched area shown in FIG. 6 in the rear image 5Rr. Here, the occurrence of the blind spot area 5a causes distortion in the rear image 5Rr in the overhead image 5.

Blind Spot Area of Present Invention Caused by Target Object Around Vehicle 10

Figure 7:
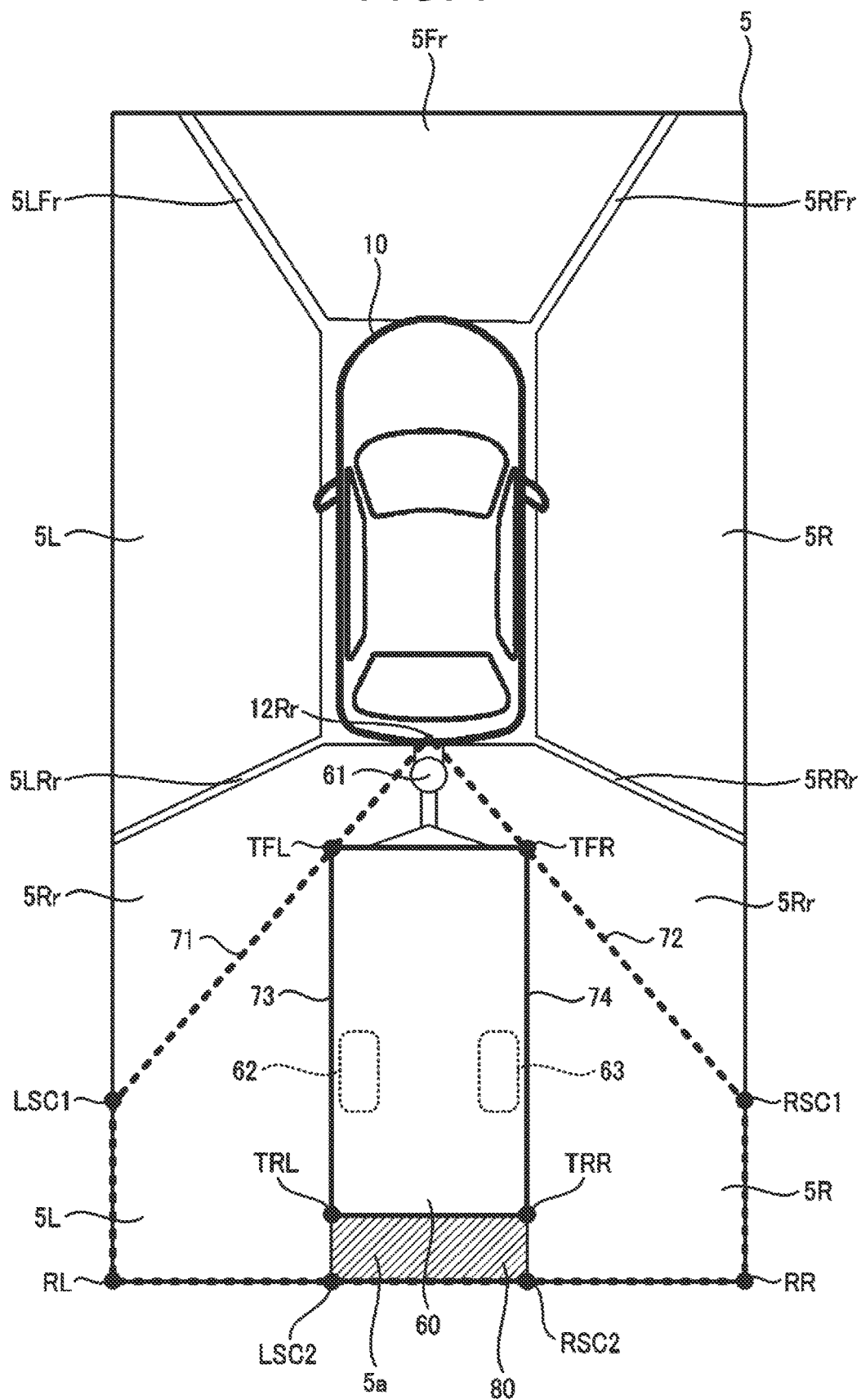
FIG. 7 is a diagram illustrating a blind spot area of the present invention caused by towing a trailer.

FIG. 7 is a diagram illustrating a blind spot area of the present invention caused by towing a trailer. As similar to the overhead image 5 illustrated in FIG. 4, the overhead image 5 of the vehicle 10 shown in FIG. 7 is generated by combining the front image 5Fr, the left side image 5L, the right side image 5R, and the rear image 5Rr extracted based on the imaging data of the front camera 12Fr, the left side camera 12L, the right side camera 12R, and the rear camera 12Rr. The overhead image 5 is displayed on the touch panel 42 when the trailer 60 is connected to the vehicle 10, for example. The overhead image 5 may be displayed on the touch panel 42, for example, when the vehicle 10 starts moving while the trailer 60 is connected to the vehicle 10, when the user selects, for example, a "towing support button" while driving the vehicle 10 towing the trailer 60, or when the user selects, for example, an "image display button" to display the overhead image.

When generating the overhead image 5 of the vehicle 10, as a method of generation, for example, adjacent images of the front image 5Fr, the left side image 5L, the right side image 5R, and the rear image 5Rr extracted in a predetermined view angle range may be combined to generate the overhead image 5. Here, the front image 5Fr in the generated overhead image 5 is an image that includes the largest proportion of imaging data of the imaging area imaged by the front camera 12Fr. The left side image 5L is an image that includes the largest proportion of imaging data of the imaging area imaged by the left side camera 12L. The right side image 5R is an image that includes the largest proportion of imaging data of the imaging area imaged by the right side camera 12R. The rear image 5Rr is an image that includes the largest proportion of imaging data of the imaging area imaged by the rear camera 12Rr.

For example, in FIG. 7, when combining the left side image 5L and the rear image 5Rr, the image at a boundary line 5LRr representing the boundary between the left side image 5L and the rear image 5Rr is an image obtained by combining the left side image 5L and the rear image 5Rr at a ratio of 50% each. As the image moves away from the boundary line 5LRr toward the left side image 5L, the ratio of the combination of the left side image 5L increases and the ratio of the combination of the rear image 5Rr decreases. As the image moves away from the boundary line 5LRr toward the rear image 5Rr, the ratio of the combination of the rear image 5Rr increases and the ratio of the combination of the left side image 5L decreases. The same applies to the combination of images regarding other boundary lines 5RRr, 5RFr, and 5LFr.

As a method of generating the overhead image 5, for example, there is a case where the front image 5Fr, the left side image 5L, the right side image 5R, and the rear image 5Rr extracted in a predetermined view angle range are simply connected as they are. Here, the front image 5Fr in the generated overhead image 5 becomes an image that includes only the imaging data of the imaging area imaged by the front camera 12Fr. The left side image 5L is an image that includes only the imaging data of the imaging area imaged by the left side camera 12L. The right side image 5R is an image that includes only the imaging data of the imaging area imaged by the right side camera 12R. The rear image 5Rr is an image that includes only the imaging data of the imaging area imaged by the rear camera 12Rr.

By the way, the view angle range of the captured images captured by the front camera 12Fr, the left side camera 12L, the right side camera 12R, and the rear camera 12Rr is set to such a width that adjacent captured images overlap each other to a certain extent. Therefore, as the image to be used in the overlapping area, it is also possible to select and use an image of one of the images taken overlappingly by two adjacent cameras. For example, in the case of the front image 5Fr, the left side image 5L, the right side image 5R, and the rear image 5Rr that are divided as illustrated in FIG. 7, an image in a region close to the left side image 5L in the rear image 5Rr is also captured by the left side camera 12L. Therefore, the rear image 5Rr can be displayed using the captured image that is captured overlappingly by the left side camera 12L. Similarly, an image in a region close to the right side image 5R in the rear image 5Rr can be displayed using a captured image that is captured overlappingly by the right side camera 12R.

That is, even when the overhead image 5 is divided into the front image 5Fr, the left side image 5L, the right side image 5R, and the rear image 5Rr as illustrated in FIG. 7, the images in each direction can be displayed by changing the allocation of the images in each direction within a range of the area where the images are overlappingly captured. Changing the allocation of the images in each direction means, for example, when the overhead image 5 is generated by combining adjacent images, changing the combination rate of imaging data of the images in each direction. For example, when the overhead image 5 is generated by simply connecting the images as they are, the range using the imaging data of the images in each direction may be changed.

The imaging data of the rear image 5Rr acquired by the rear camera 12Rr is an example of "first imaging data" of the present invention. The imaging data of the left side image 5L acquired by the left side camera 12L and the imaging data of the right side image 5R acquired by the right side camera 12R are examples of "second imaging data" of the present invention.

Specifically, as illustrated in FIG. 7, in the overhead image 5 displayed on the touch panel 42, the left half line 71 is drawn starting from the rear camera coordinates indicating the position of the rear camera 12Rr and passing through the trailer front left coordinates indicating the front left end TFL of the trailer 60, and coordinates of an intersection position LSC1 between the left half line 71 and the edge of the overhead image 5 are set as left intersection coordinates. Similarly, the right half line 72 is drawn starting from the rear camera coordinates indicating the position of rear camera 12Rr and passing through the trailer right front coordinates indicating the front right end TFR of the trailer 60, and coordinates of an intersection position RSC1 between the right half line 72 and the edge of the overhead image 5 are set as right intersection coordinates. In the present example, the vehicle 10 is not steered, and the intersection position LSC1 intersects with the left edge of the overhead image 5, and the intersection position RSC1 intersects with the right edge of the overhead image 5.

A left half line 73 is drawn starting from the trailer left front coordinates indicating the front left end TFL of the trailer 60 and passing through trailer left rear coordinates indicating a rear left end TRL of the trailer 60, and coordinates of an intersection position LSC2 between the left half line 73 and the edge of the overhead image 5 are set as left rear intersection coordinates. A right half line 74 is drawn starting from the trailer right front coordinates indicating the front right end TFR of the trailer 60 and passing through trailer right rear coordinates indicating a rear right end TRR of the trailer 60, and coordinates of an intersection position RSC2 between the right half line 74 and the edge of the overhead image 5 are set as right rear intersection coordinates. In the present example, the vehicle 10 is not steered, and the intersection position LSC2 and the intersection position RSC2 intersect with the rear edge of the overhead image 5. Coordinates of a left rear corner RL of the overhead image 5 are set as left rear corner coordinates, and coordinates of a right rear corner RR of the overhead image 5 are set as right rear corner coordinates.

The rear camera coordinates indicating the position of the rear camera 12Rr are an example of "first coordinates" of the present invention. The trailer left front coordinates indicating the front left end TFL of the trailer 60 and the trailer right front coordinates indicating the front right end TFR of the trailer 60 are examples of "second coordinates" of the present invention. The trailer left rear coordinates indicating the rear left end TRL of the trailer 60 and the trailer right rear coordinates indicating the rear right end TRR of the trailer 60 are examples of "third coordinates" of the present invention. The left intersection coordinates indicating the intersection position LSC1 between the left half line 71 and the edge of the overhead image 5, and the right intersection coordinates indicating the intersection position RSC1 between the right half line 72 and the edge of the overhead image 5 are examples of "fourth coordinates" of the present invention. The left rear intersection coordinates indicating the intersection position LSC2 between the left half line 73 and the edge of the overhead image 5, and the right rear intersection coordinates indicating the intersection position RSC2 between the right half line 74 and the edge of the overhead image 5 are examples of "fifth coordinates" of the present invention.

Here, in the present invention, the area that cannot be imaged by the rear camera 12Rr because the camera is blocked by the trailer 60, that is, the area on the left side of the trailer 60 surrounded by the front left end TFL, the intersection position LSC1, the left rear corner RL, the intersection position LSC2, and the rear left end TRL, is displayed using the left side image 5L imaged by the left side camera 12L. The area on the right side of the trailer 60 surrounded by the front right end TFR, the intersection position RSC1, the right rear corner RR, the intersection position RSC2, and the rear right end TRR is displayed using the right side image 5R imaged by the right side camera 12R.

As a result, the blind spot area 5a in the overhead image 5 illustrated in FIG. 7 becomes a hatched area on the rear side of the trailer 60 surrounded by the rear left end TRL, the intersection position LSC2, the intersection position RSC2, and the rear right end TRR. The blind spot area 5a is an area that cannot be imaged by either the left side camera 12L or the right side camera 12R. As such, when the vehicle 10 is not steered, compared to the blind spot area 5a of the related art surrounded by the front left end TFL, the intersection position LSC, the intersection position RSC, and the front right end TFR illustrated in FIG. 5, the range can be reduced. Therefore, distortion that occurs in the rear image 5Rr of the overhead image 5 due to the occurrence of the blind spot area 5a can be reduced.

Figure 8:
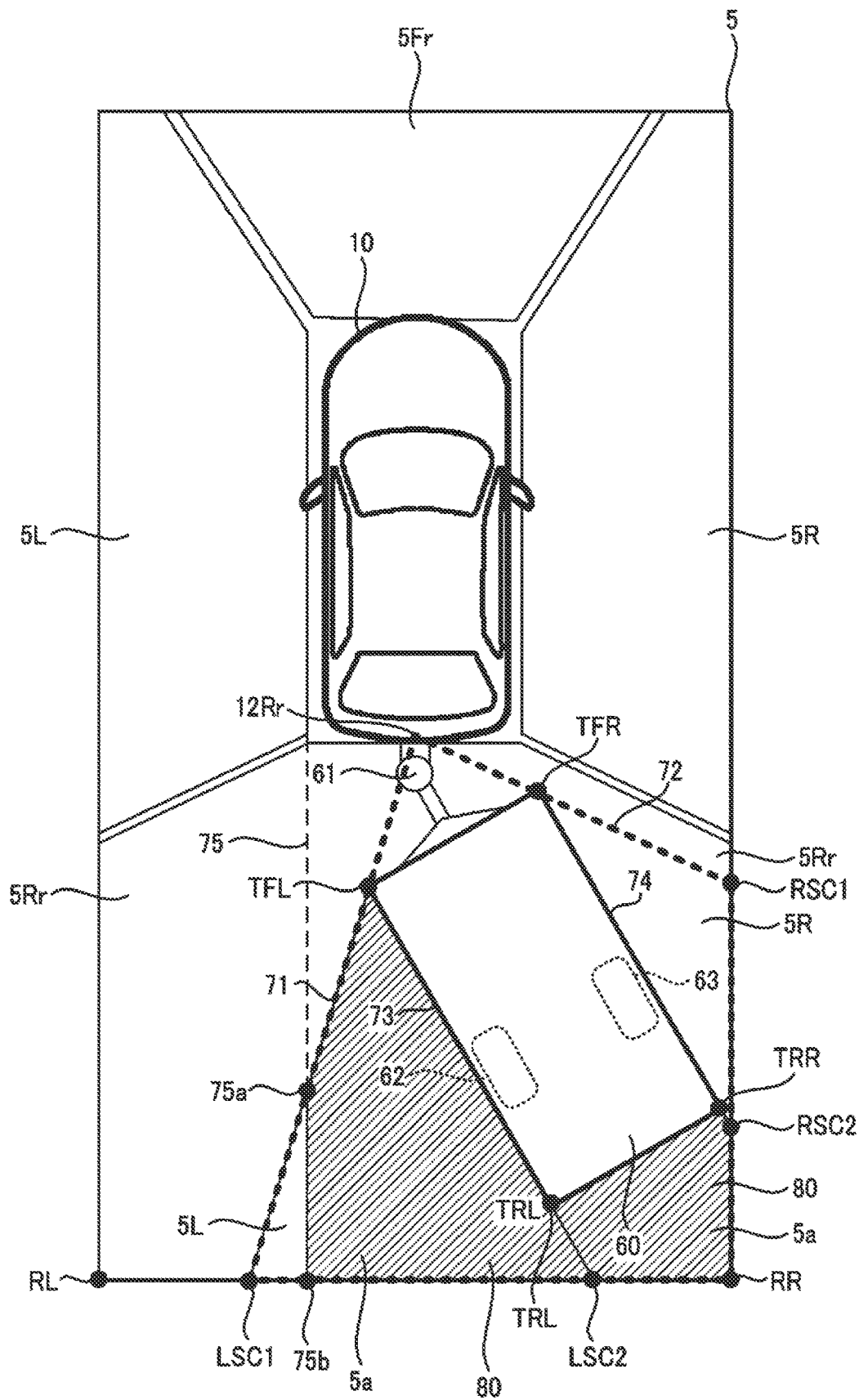
FIG. 8 is a diagram illustrating the blind spot area of the present invention that occurs when a vehicle towing a trailer is being steered.

FIG. 8 is a diagram illustrating a blind spot area according to the present invention that occurs when a vehicle towing a trailer is being steered. As illustrated in FIG. 8, when the vehicle 10 towing the trailer 60 changes a traveling direction thereof, for example to the right, the intersection position LSC1 of the left half line 71, the intersection position LSC2 of the left half line 73, the intersection position RSC2 of the right half line 74, and the intersection position RSC1 of the right half line 72 each move to the right in response to changes in the traveling direction. As a result, in the present example, the intersection position LSC1 intersects with the rear edge of the overhead image 5, and the intersection position RSC2 intersects with the right edge of the overhead image 5. Here, an intersection position of a limit line 75 indicating an edge of an area that can be imaged by the left side camera 12L and the left half line 71 is defined as an intersection position 75a, and an intersection position of the limit line 75 and the rear edge of the overhead image 5 is defined as an intersection position 75b.

Here, in the present invention, an area that cannot be imaged by the rear camera 12Rr because the camera is blocked by the trailer 60, that is, the area on the left side of the trailer 60 surrounded by the intersection position 75a, the intersection position LSC1, and the intersection position 75b, is displayed using the left side image 5L imaged by the left side camera 12L. An area on the right side of the trailer 60 surrounded by the front right end TFR, the intersection position RSC1, the intersection position RSC2, and the rear right end TRR is displayed using the right side image 5R imaged by the right side camera 12R.

As a result, the blind spot area 5a in the overhead image 5 illustrated in FIG. 8 is a hatched area on the left side of the trailer 60 surrounded by the front left end TFL, the intersection position 75a, the intersection position 75b, the intersection position LSC2, and the rear left end TRL, and a hatched area on the rear side of the trailer 60 surrounded by the rear left end TRL, the intersection position LSC2, the right rear corner RR, the intersection position RSC2, and the rear right end TRR. The blind spot areas 5a are areas that cannot be imaged by either the left side camera 12L or the right side camera 12R. As such, when the vehicle 10 has been steered, compared to the blind spot area 5a of the related art surrounded by the front left end TFL, the intersection position LSC, the intersection position RSC, and the front right end TFR illustrated in FIG. 6 above, the range can be reduced. Therefore, distortion that occurs in the rear image 5Rr of the overhead image 5 due to the occurrence of the blind spot area 5a can be reduced.

In the examples illustrated in FIGS. 7 and 8, examples are shown in which when a connection angle (steering wheel angle of vehicle 10) between the vehicle 10 and the trailer 60 is small, the intersection position LSC2 of the left half line 73 and the intersection position RSC2 of the right half line 74 intersect with the rear edge of the overhead image 5, whereas when the connection angle (steering wheel angle of vehicle 10) between the vehicle 10 and the trailer 60 is large, the intersection position RSC2 of the right half line 74 intersects with the right edge of the overhead image 5. However, the present invention is not limited thereto. For example, when a width of the trailer 60 illustrated in FIGS. 7 and 8 is large, or when a width of the overhead image 5 is small, even when the connection angle between the vehicle 10 and the trailer 60 is small, the intersection position RSC2 of the right half line 74 may intersect with the right edge of the overhead image 5. In FIG. 8, a case is described in which the vehicle 10 towing the trailer 60 changes a traveling direction thereof to the right, but the present invention is not limited thereto, and the same applies to a case where the vehicle 10 changes a traveling direction thereof to the left, for example.

Control of Vehicle 10 by Control ECU 20

Figure 9:
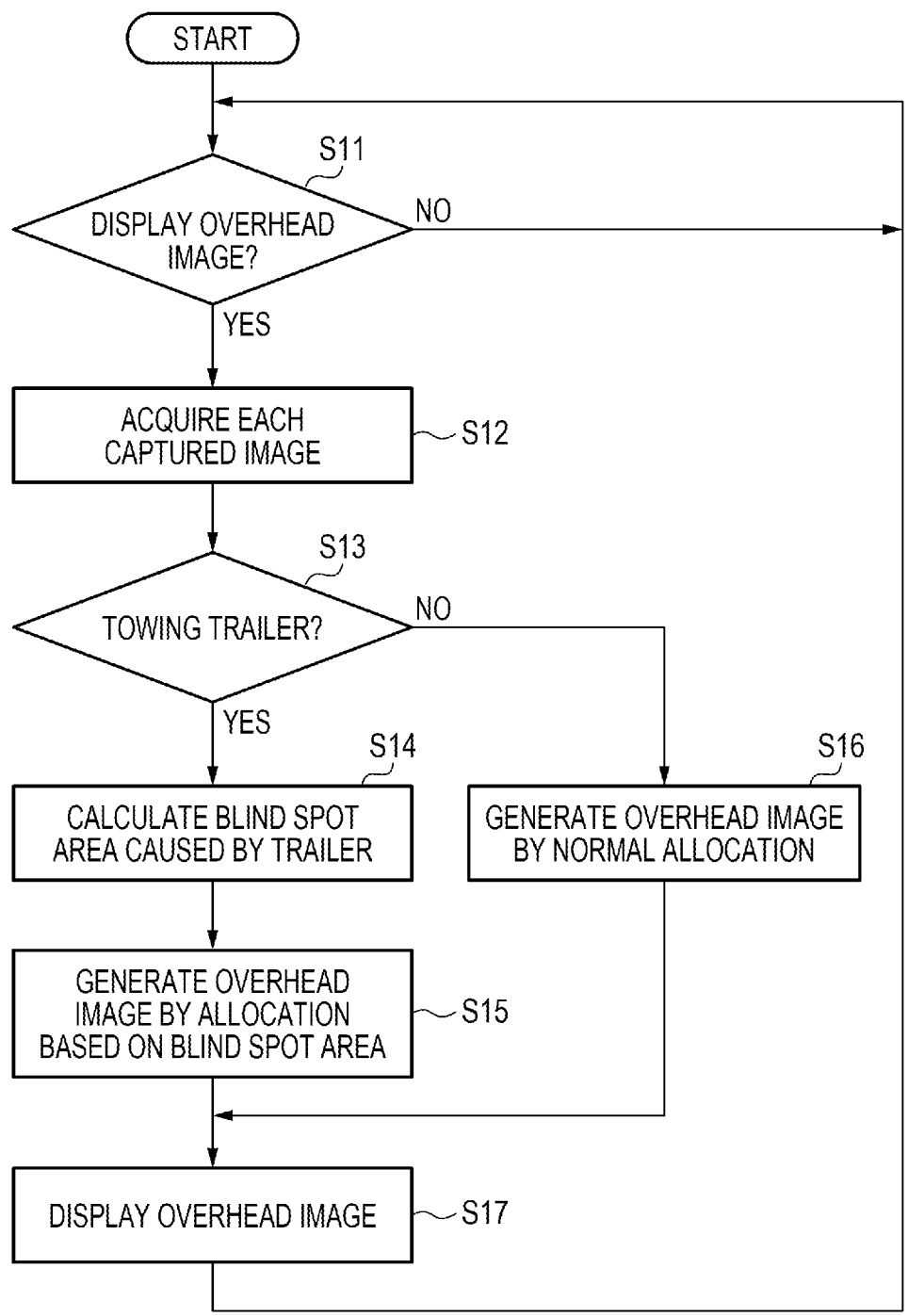
FIG. 9 is a flowchart illustrating display control of an overhead image by a control ECU of the vehicle.

FIG. 9 is a flowchart illustrating display control of an overhead image by a control ECU of the vehicle.

First, the control ECU 20 determines whether to display the overhead image 5 of the vehicle 10 on, for example, the touch panel 42 of the navigation device 18 (step S11). As described above, the overhead image 5 is displayed, for example, when the user selects the "image display button" that displays an overhead image.

In step S11, when the overhead image 5 is not to be displayed (step S11: No), the control ECU 20 repeats the process of step S11. In step S11, when displaying the overhead image 5 (step S11: Yes), the control ECU 20 acquires each captured image for generating the overhead image 5 (step S12). The captured images are images captured by the front camera 12Fr, the rear camera 12Rr, the left side camera 12L, and the right side camera 12R to combine and generate the overhead image 5.

Next, the control ECU 20 determines whether the vehicle 10 is towing, for example, the trailer 60 (step S13). Whether the trailer 60 is being towed may be determined based on, for example, an image captured by the rear camera 12Rr, may be determined based on information acquired by a sensor other than the camera, or may be determined by the user's settings.

In step S13, when the trailer 60 is being towed (step S13: Yes), the control ECU 20 calculates a blind spot area caused by the trailer 60 (step S14). The control ECU 20 calculates, for example, in the overhead image 5 of the vehicle 10 towing the trailer 60, as illustrated in FIGS. 7 and 8, an area that cannot be captured by the rear camera 12Rr because the camera is blocked by the trailer 60, as the blind spot area 5*a* of the rear camera 12Rr. Specifically, in the case of FIG. 7, the area around the trailer 60 surrounded by the front left end TFL, the intersection position LSC1, the left rear corner RL, the intersection position LSC2, the intersection position RSC2, the right rear corner RR, the intersection position RSC1, and the front right end TFR is calculated as the blind spot area 5*a* of the rear camera 12Rr. In the case of FIG. 8, the area around the trailer 60 surrounded by the front left end TFL, the intersection position 75*a*, the intersection position LSC1, the intersection position 75*b*, the intersection position LSC2, the right rear corner RR, the intersection position RSC2, the intersection position RSC1, and the front right end TFR is calculated as the blind spot area 5*a* of the rear camera 12Rr.

Next, the control ECU 20 generates the overhead image 5 by allocation based on the blind spot area 5*a* (step S15). In the blind spot area 5*a* of the rear camera 12Rr calculated in step S14, for example, in the case of FIG. 7, the control ECU 20 determines that the area on the left side of the trailer 60 surrounded by the front left end TFL, the intersection position LSC1, the left rear corner RL, the intersection position LSC2, and the rear left end TRL is an area that can be displayed using the imaging data acquired by the left side camera 12L. The control ECU 20 determines that the area on the right side of the trailer 60 surrounded by the front right end TFR, the intersection position RSC1, the right rear corner RR, the intersection position RSC2, and the rear right end TRR is an area that can be displayed using the imaging data acquired by the right side camera 12R. Similarly, in the case of FIG. 8, the control ECU 20 determines that the area on the left side of the trailer 60 surrounded by the intersection position 75*a*, the intersection position LSC1, and the intersection position 75*b* is an area that can be displayed using the imaging data acquired by the left side camera 12L. The control ECU 20 determines that the area on the right side of the trailer 60 surrounded by the front right end TFR, the intersection position RSC1, the intersection position RSC2, and the rear right end TRR is an area that can be displayed using the imaging data acquired by the right side camera 12R.

The control ECU 20 generates the overhead image 5 by displaying an image of the area determined to be displayable using the imaging data of the left side camera 12L or the right side camera 12R. The control ECU 20 generates the overhead image 5 by decreasing the imaging data acquired by the rear camera 12Rr and increasing the imaging data acquired by the left side camera 12L or the right side camera 12R. In the case of FIG. 7, the control ECU 20 displays a blind spot area image 80 in the area behind the trailer 60 surrounded by the rear left end TRL, the intersection position LSC2, the intersection position RSC2, and the rear right end TRR as an area that cannot be complemented even with the imaging data of the left side camera 12L and the right side camera 12R. In the case of FIG. 8, the control ECU 20 displays the blind spot area image 80 in the area on the left side of the trailer 60 surrounded by the front left end TFL, the intersection position 75*a*, the intersection position 75*b*, the intersection position LSC2, and the rear left end TRL, and the area behind the trailer 60 surrounded by the rear left end TRL, the intersection position LSC2, the right rear corner RR, the intersection position RSC2, and the rear right end TRR, as areas that cannot be complemented even with the imaging data of the left side camera 12L and the right side camera 12R.

On the other hand, in step S13, when the trailer 60 is not being towed (step S13: No), the control ECU 20 generates the overhead image 5 by normal allocation (step S16). The normal allocation is, for example, the allocation illustrated in FIG. 4 of the front image 5Fr, the left side image 5L, the right side image 5R, and the rear image 5Rr extracted based on the imaging data of each imaging area captured by the front camera 12Fr, the left side camera 12L, the right side camera 12R, and the rear camera 12Rr.

Next, the control ECU 20 displays the overhead image 5 generated in step S15 or step S16 on the touch panel 42 (step S17).

As described above, according to the control ECU 20 of the present invention, when there is a blind spot area in the rear imaging data acquired by the rear camera 12Rr, in the overhead image, change can be made such that the allocation of rear imaging data where a blind spot area exists is decreased, and the allocation of left side imaging data acquired by the left side camera 12L and right side imaging data acquired by the right side camera 12R is increased. As a result, the blind spot area 5*a* in the overhead image 5 of the vehicle 10 towing the trailer 60 can be reduced, so that distortion occurring in the overhead image 5 can be reduced.

A control method described in the embodiments described above can be implemented by executing a control program prepared in advance on a computer. The control program is recorded on a computer-readable storage medium, and is executed by being read from the storage medium. The control program may be provided in a form stored in a non-transitory storage medium such as a flash memory, or may be provided via a network such as the Internet. The computer that executes the control program may be in the control device, may be in an electronic device such as a smartphone, a tablet terminal, or a personal computer that can communicate with the control device, or may be in a server device that can communicate with the control devices and electronic devices.

Although the embodiments of the present invention are described above, the present invention is not limited to the above-described embodiments, and can be modified, improved, or the like as appropriate.

The specification describes at least the following matters. Although components corresponding to those in the above-described embodiments are shown in parentheses, the present invention is not limited thereto.

(1) A control device (control ECU 20) that includes, an image processing unit (image processing unit 55) that generates an overhead image (overhead image 5) showing a space including a moving object (vehicle 10) and surroundings of the moving object using a plurality of pieces of imaging data acquired by a plurality of imaging devices (front camera 12Fr, rear camera 12Rr, left side camera 12L, right side camera 12R) in the moving object, a display control unit (display control unit 56) that displays the overhead image generated by the image processing unit on a display device, and a blind spot area determination unit (blind spot area determination unit 57) that determines a blind spot area (blind spot area 5a) in the imaging data based on detection of a target object (trailer 60) around the moving object, where the image processing unit changes allocation of first imaging data and second imaging data different from the first imaging data in the overhead image based on whether it is determined that the blind spot area exists in the predetermined first imaging data among the plurality of pieces of imaging data.

According to (1), it is possible to change the allocation of the first imaging data and the allocation of the second imaging data different from the first imaging data used to generate the overhead image depending on whether a blind spot area exists in the first imaging data. Therefore, when generating an overhead image that includes the moving object and the surroundings thereof, it is possible to generate an overhead image with less distortion.

(2) The control device according to (1), where when it is determined that the blind spot area exists in the first imaging data, the image processing unit decreases the allocation of the first imaging data in the overhead image and increases the allocation of the second imaging data in the overhead image than when it is determined that the blind spot area does not exist in the first imaging data.

According to (2), when a blind spot area exists in the first imaging data, changes can be made such that the allocation of the first imaging data in which the blind spot area exists is decreased and the allocation of the second imaging data is increased in the overhead image. Therefore, when generating an overhead image that includes the moving object and the surroundings thereof, it is possible to generate an overhead image with less distortion.

(3) The control device according to (2), where when it is determined that the blind spot area exists in the first imaging data, the image processing unit decreases the allocation of the first imaging data in a portion of the overhead image corresponding to the blind spot area and increases the allocation of the second imaging data in a portion of the overhead image corresponding to the blind spot area than when it is determined that the blind spot area does not exist in the first imaging data.

According to (3), when a blind spot area exists in the first imaging data, changes can be made such that, in the overhead image, the allocation of the first imaging data in the portion corresponding to the blind spot area is decreased and the allocation of the second imaging data in the portion corresponding to the blind spot area is increased. Therefore, when generating an overhead image that includes the moving object and the surroundings thereof, it is possible to generate an overhead image with less distortion.

(4) The control device according to any one of (1) to (3), where the first imaging data is imaging data acquired by an imaging device that captures an image in a front direction or a rear direction of the moving object among the plurality of imaging devices, and the second imaging data is imaging data acquired by an imaging device that captures an image in a left direction or a right direction of the moving object among the plurality of imaging devices.

According to (4), it is possible to generate an overhead image by changing the allocation of the first imaging data of the imaging device that captures an image in the front direction or the rear direction of the moving object and the second imaging data of the imaging device that captures an image in the left direction or the right direction and is adjacent to the imaging device that captures an image in the front direction or the rear direction. Therefore, for example, when there is a blind spot area in the first imaging data of the imaging device that captures an image in the front direction or the rear direction, the overhead image can be generated by increasing the second imaging data of the adjacent imaging device that captures an image in the left direction or the right direction and decreasing the first imaging data.

(5) The control device according to any one of (1) to (4), where the blind spot area determination unit determines the blind spot area based on characteristics of the target object and a positional relationship between the target object and the moving object.

As in (5), it is preferable to determine whether a blind spot area exists based on the characteristics of the target object and the positional relationship between the target object and the moving object.

(6) The control device according to (5), where the blind spot area determination unit determines the characteristics of the target object and the positional relationship based on at least one of the plurality of pieces of imaging data.

As in (6), to determine the characteristics of the target object and the positional relationship, it is preferable to perform the determination based on the imaging data acquired by the imaging device.

(7) The control device according to any one of (1) to (6), where the target object is a trailer towed by the moving object.

As in (7), it is preferable to be able to reduce the distortion that occurs in the overhead image of the moving object towing the trailer.

(8) The control device according to (7), where the first imaging data is imaging data acquired by a first imaging device that captures an image in a rear direction of the moving object among the plurality of imaging devices, and the second imaging data is imaging data acquired by a second imaging device that captures an image in a left direction or a right direction of the moving object among the plurality of imaging devices.

According to (8), it is possible to generate an overhead image by changing the allocation of the imaging data of the first imaging device that captures an image in the rear direction of the moving object towing the trailer and the imaging data of the second imaging device that captures an image in the left direction or the right direction and is adjacent to the first imaging device. Therefore, for example, when towing a trailer causes a blind spot area in the imaging data of the first imaging device, for example, distortion occurring in the overhead image can be reduced by increasing the imaging data of the adjacent second imaging device that captures an image in the left direction or the right direction and decreasing the imaging data of the first imaging device.

(9) The control device according to (8), where
the blind spot area determination unit determines, based on
first coordinates indicating a position of the first imaging device in the moving object,
second coordinates indicating a front end of the trailer,
third coordinates indicating a rear end of the trailer,
fourth coordinates in a half line starting from the first coordinates and passing through the second coordinates, and
fifth coordinates in a half line starting from the second coordinates and passing through the third coordinates,
an area surrounded by the second coordinates, the fourth coordinates, and the fifth coordinates as the blind spot area.

As in (9), it is preferable to determine the blind spot area caused by towing the trailer using the first to fifth coordinates of the imaging device and the trailer.

(10) The control device according to (9), where
the fourth coordinates are coordinates where the half line starting from the first coordinates and passing through the second coordinates intersects with an edge of the overhead image, and
the fifth coordinates are coordinates where the half line starting from the second coordinates and passing through the third coordinates intersects with the edge of the overhead image.

As in (10), to determine the blind spot area in the overhead image, it is preferable to use the fourth and fifth coordinates that intersect with the overhead image.

(11) The control device according to any one of (1) to (10), where
when it is determined that the blind spot area exists in the first imaging data, and there is an area that cannot be complemented by the second imaging data in a portion of the overhead image that corresponds to the blind spot area, the image processing unit allocates a blind spot area image indicating the blind spot area to the area that cannot be complemented.

As in (11), when there is a blind spot area that cannot be complemented, it is preferable to allocate the blind spot area image to the area and notify the user.

(12) A control method by a control device includes steps executed by a processor of the control device of:
a processor of the control device
generating an overhead image showing a space including a moving object and surroundings of the moving object using a plurality of pieces of imaging data acquired by a plurality of imaging devices in the moving object,
causing a display device to display the generated overhead image,
determining a blind spot area in the imaging data based on detection of a target object around the moving object, and
when generating the overhead image, changing allocation of first imaging data and second imaging data different from the first imaging data in the overhead image based on whether it is determined that the blind spot area exists in the predetermined first imaging data among the plurality of pieces of imaging data.

According to (12), it is possible to change the allocation of the first imaging data and the allocation of the second imaging data different from the first imaging data used to generate the overhead image depending on whether a blind spot area exists in the first imaging data. Therefore, when generating an overhead image that includes the moving object and the surroundings thereof, it is possible to generate an overhead image with less distortion.

(13) A storage medium storing a control program for a control device that causes a processor of the control device to execute processes of,
generating an overhead image showing a space including a moving object and surroundings of the moving object using a plurality of pieces of imaging data acquired by a plurality of imaging devices in the moving object,
causing a display device to display the generated overhead image,
determining a blind spot area in the imaging data based on detection of a target object around the moving object, and
when generating the overhead image, changing allocation of first imaging data and second imaging data different from the first imaging data in the overhead image based on whether it is determined that the blind spot area exists in the predetermined first imaging data among the plurality of pieces of imaging data.

According to (13), it is possible to change the allocation of the first imaging data and the allocation of the second imaging data different from the first imaging data used to generate the overhead image depending on whether a blind spot area exists in the first imaging data. Therefore, when generating an overhead image that includes the moving object and the surroundings thereof, it is possible to generate an overhead image with less distortion.

What is claimed is:
1. A control device comprising:
an image processing unit configured to generate an overhead image showing a space including a moving object and surroundings of the moving object using a plurality of pieces of imaging data acquired by a plurality of imaging devices including at least a first camera and a second camera in the moving object;
a display control unit configured to display the overhead image generated by the image processing unit on a display device; and
a blind spot area determination unit configured to determine a blind spot area in the imaging data based on detection of a target object around the moving object, wherein
the image processing unit is configured to generate a first area in the overhead image based on the imaging data acquired by the first camera and to generate a second area in the overhead image different from the first area based on the imaging data acquired by the second camera,
the image processing unit is configured to change allocation of the first area and the second area in the overhead image based on whether it is determined that the blind spot area exists in the first area, and
when it is determined that the blind spot area exists in the first area, the image processing unit decreases the allocation of the first area in the overhead image and increases the allocation of the second area in the overhead image than when it is determined that the blind spot area does not exist in the first area, wherein the image processing unit is configured to change allocation of the first area and the second area based on at least one characteristic of the target object.

2. The control device according to claim 1, wherein when it is determined that the blind spot area exists in the first area, the image processing unit decreases the allocation of the first area in a portion of the overhead image corresponding to the blind spot area and increases the allocation of the second area in a portion of the overhead image corresponding to the blind spot area than when it is determined that the blind spot area does not exist in the first area.

3. The control device according to claim 1, wherein the blind spot area is created by a trailer towed by the moving object, the first area is an area in a rear direction of the moving object, and the second area is an area in a left direction or a right direction of the moving object.

4. The control device according to claim 1, wherein the blind spot area is created by a trailer towed by the moving object, and the blind spot area determination unit is configured to determine the blind spot area based on whether the moving object is towing the trailer.

5. The control device according to claim 3, wherein the blind spot area determination unit determines, based on
first coordinates indicating a position of the first camera in the moving object,
second coordinates indicating a front end of the trailer,
third coordinates indicating a rear end of the trailer,
fourth coordinates in a half line starting from the first coordinates and passing through the second coordinates, and
fifth coordinates in a half line starting from the second coordinates and passing through the third coordinates,
an area surrounded by the second coordinates, the fourth coordinates, and the fifth coordinates as the blind spot area.

6. The control device according to claim 5, wherein the fourth coordinates are coordinates where the half line starting from the first coordinates and passing through the second coordinates intersects with an edge of the overhead image, and the fifth coordinates are coordinates where the half line starting from the second coordinates and passing through the third coordinates intersects with the edge of the overhead image.

7. The control device according to claim 1, wherein when it is determined that the blind spot area exists in the first area, and there is an area that cannot be complemented by the second area in a portion of the overhead image that corresponds to the blind spot area, the image processing unit allocates a blind spot area image indicating the blind spot area to the area that cannot be complemented.

8. A control method by a control device, the method comprising steps executed by a processor of the control device of:
generating an overhead image showing a space including a moving object and surroundings of the moving object using a plurality of pieces of imaging data acquired by a plurality of imaging devices including at least a first camera and a second camera in the moving object, causing a display device to display the generated overhead image, determining a blind spot area in the imaging data based on detection of a target object around the moving object, and when generating the overhead image, generating a first area in the overhead image based on the imaging data acquired by the first camera and generating a second area in the overhead image different from the first area based on the imaging data acquired by the second camera, and changing allocation of the first different from the first imaging data in the overhead image based on whether it is determined that the blind spot area exists in the first area, changing allocation of the first area and the second area based on at least one characteristic of the target object, and when it is determined that the blind spot area exists in the first area, decreasing the allocation of the first area in the overhead image and increasing the allocation of the second area in the overhead image than when it is determined that the blind spot area does not exist in the first area.

9. A non-transitory computer-readable storage medium storing a control program for a control device that causes a processor of the control device to execute processes of,
generating an overhead image showing a space including a moving object and surroundings of the moving object using a plurality of pieces of imaging data acquired by a plurality of imaging devices including at least a first camera and a second camera in the moving object, causing a display device to display the generated overhead image, determining a blind spot area in the imaging data based on detection of a target object around the moving object, and when generating the overhead image, generating a first area in the overhead image based on the imaging data acquired by the first camera and generating a second area in the overhead image different from the first area based on the imaging data acquired by the second camera, and changing allocation of the first area and the second area in the overhead image based on whether it is determined that the blind spot area exists in the first area, change allocation of the first area and the second area based on at least one characteristic of the target object, and when it is determined that the blind spot area exists in the first area, decreasing the allocation of the first area in the overhead image and increasing the allocation of the second area in the overhead image than when it is determined that the blind spot area does not exist in the first area.

10. A control device comprising:
an image processing unit configured to generate an overhead image showing a space including a moving object and surroundings of the moving object using a plurality of pieces of imaging data acquired by a plurality of imaging devices including at least a first camera and a second camera in the moving object, the first camera capturing an image of a rear direction of the moving object, and the second camera capturing an image of a lateral direction of the moving object;

a display control unit configured to display the overhead image generated by the image processing unit on a display device; and a determination unit configured to determine whether the moving object is towing a trailer, wherein the image processing unit is configured to generate a first area in the overhead image based on the imaging data acquired by the first camera and to generate a second area in the overhead image different from the first area based on the imaging data acquired by the second camera, the image processing unit is configured to change allocation of the first area and the second area in the overhead image based on whether the moving object is towing the trailer, in which the image processing unit decreases the allocation of the first area and increases the allocation of the second area when the moving object is towing the trailer compared to those when the moving object is not towing the trailer.

11. The control device according to claim 10, wherein the image processing unit is configured to change allocation of the first area and the second area based on at least one of characteristic of the trailer and a positional relationship between the moving object and the trailer.

* * * * *